United States Patent

[11] 3,615,962

| [72] | Inventor | Peter D. Kaspar<br>Dover, Del. |
|---|---|---|
| [21] | Appl. No. | 705,210 |
| [22] | Filed | Feb. 13, 1968 |
| [45] | Patented | Oct. 26, 1971 |
| [73] | Assignee | International Playtex Corporation<br>Dover, Del. |

[54] METHOD OF AND APPARATUS FOR FORMING FORMATIONS MATERIAL AND COMPOSITE MATERIAL
20 Claims, 18 Drawing Figs.

[52] U.S. Cl. .................................................. 156/62.2,
156/77, 156/372, 156/552, 264/47, 118/632
[51] Int. Cl. .......................................................B29d 27/02,
B32b 31/22
[50] Field of Search........................................... 156/369,
62.2, 370, 62.8, 371, 372, 74, 373, 77, 374, 375,
376, 377, 552; 117/101; 78/58.3; 264/47; 118/70,
632

[56]                References Cited
          UNITED STATES PATENTS

| 2,726,979 | 12/1955 | Grant................................ | 156/313 |
| 2,808,343 | 10/1957 | Simmons........................... | 118/632 X |
| 3,088,859 | 5/1963 | Smith................................ | 156/377 X |
| 3,232,819 | 2/1966 | Satas................................ | 117/104 X |
| 3,233,289 | 2/1966 | Serra................................ | 264/309 X |

*Primary Examiner*—Benjamin A. Borchelt
*Assistant Examiner*—James M. Hanley
*Attorney*—Stewart J. Fried ABSTRACT: A continuous method and apparatus for forming foraminous sheet film having elastomeric properties and for composite materials including such film is disclosed. The method generally includes the steps of driving successive portions of a continuous foraminous conveyor in a substantially cylindrical path depositing a material in particularized form which material in dry form possesses elastomeric properties onto and about the inner surface of such cylindrical path; drying such material into a foraminous sheet film and removing said film from said conveyor. The process also may include the adherence of either one or two plies of material to the film.

The apparatus includes a deposition arrangement including means to deliver a flowable material which in dry form possesses elastomeric properties to a foraminous conveyor to provide a continuous foraminous film having elastomeric properties.

The preferable deposition apparatus includes a centrifugal dish-like member adapted to deliver the flowable material in particularized form onto the foraminous forming surface.

PATENTED OCT 26 1971

INVENTOR.
Peter D. Kaspar
BY
Hoge J. Sutherland
ATTORNEY.

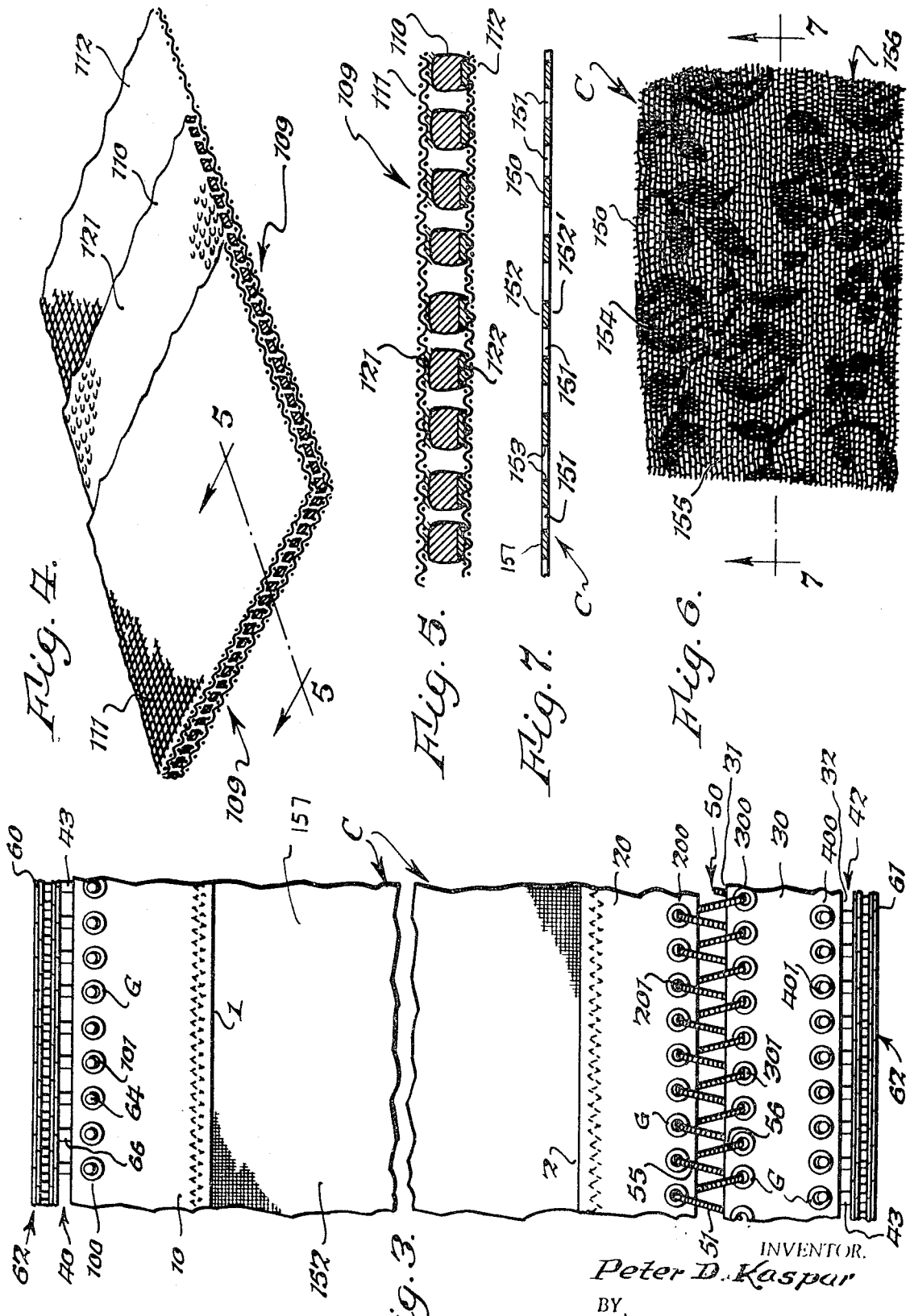

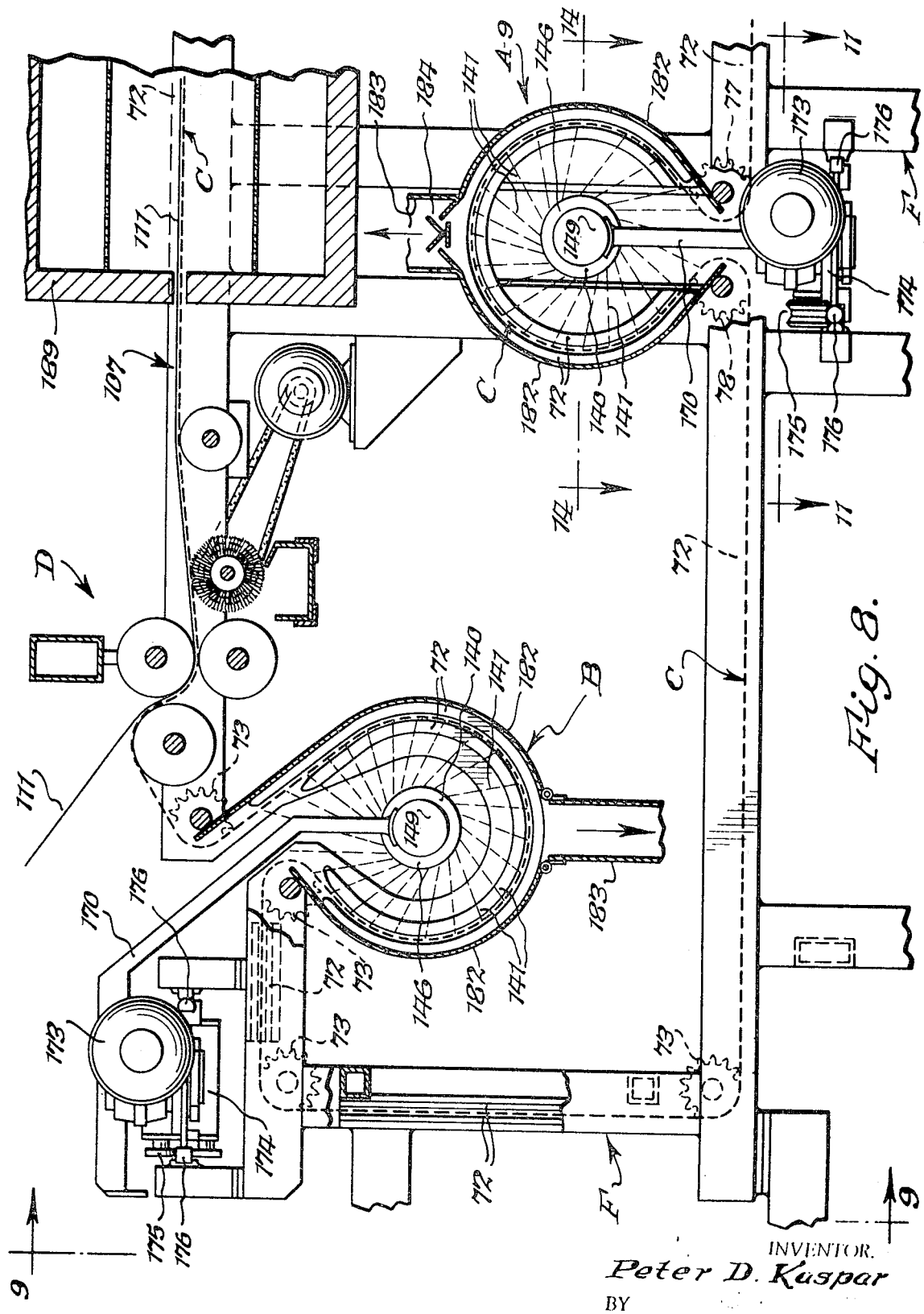

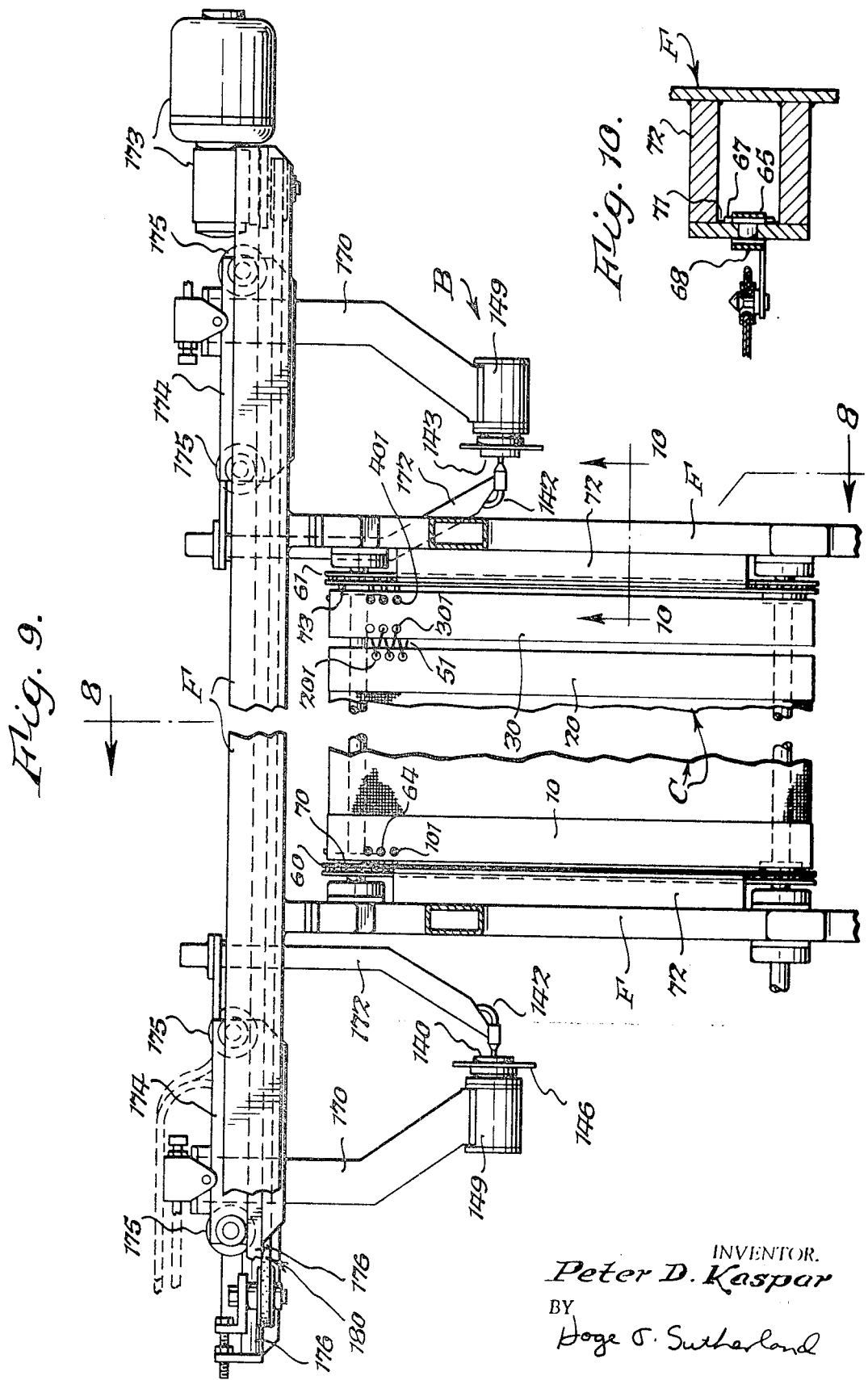

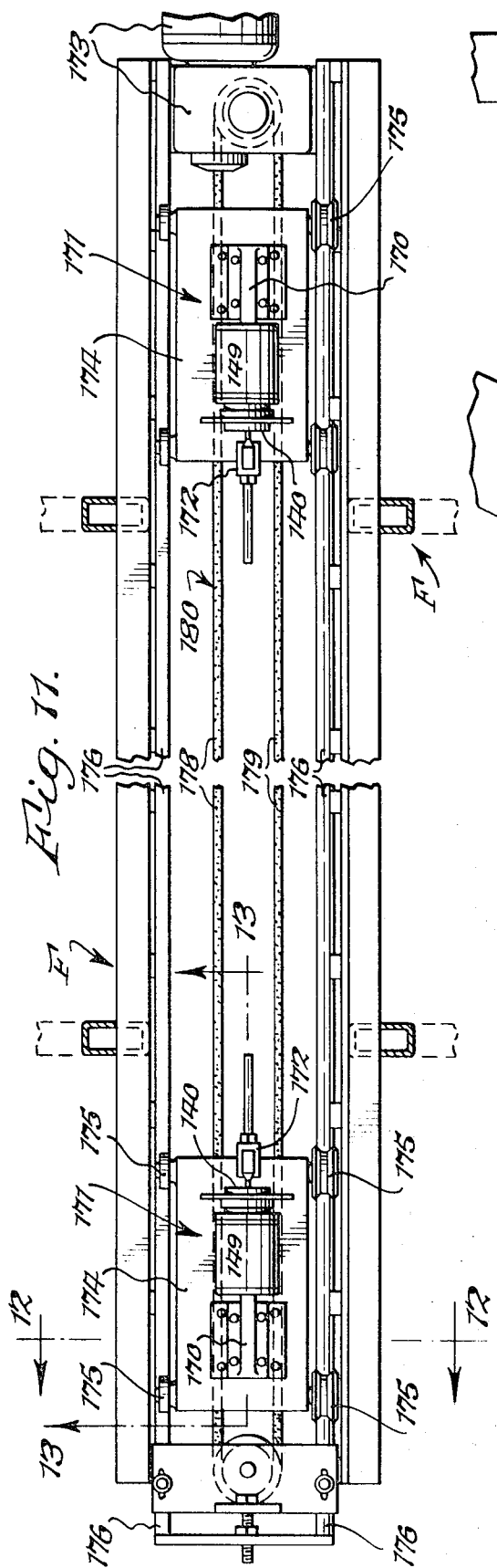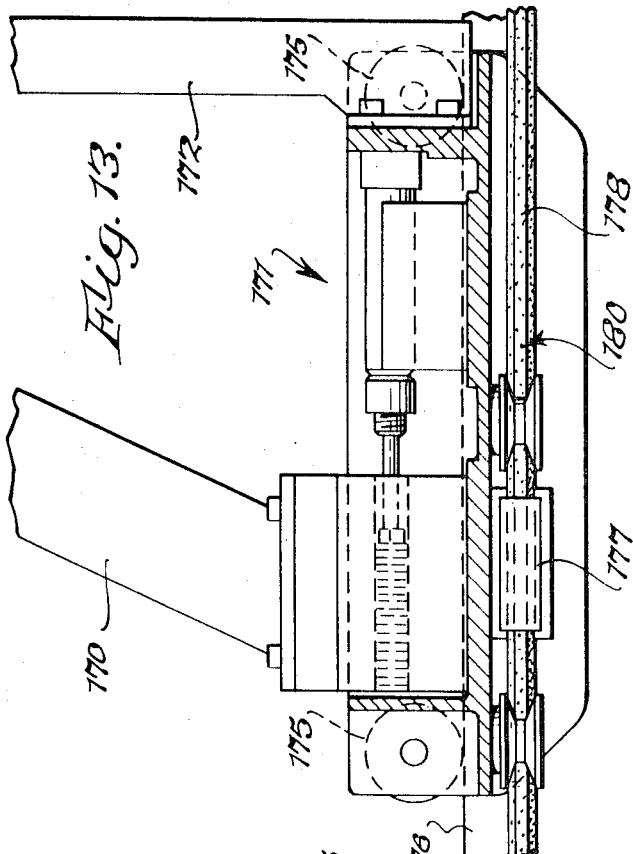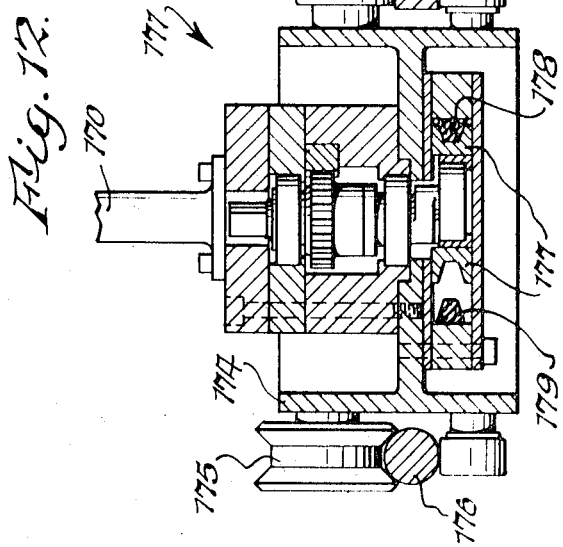

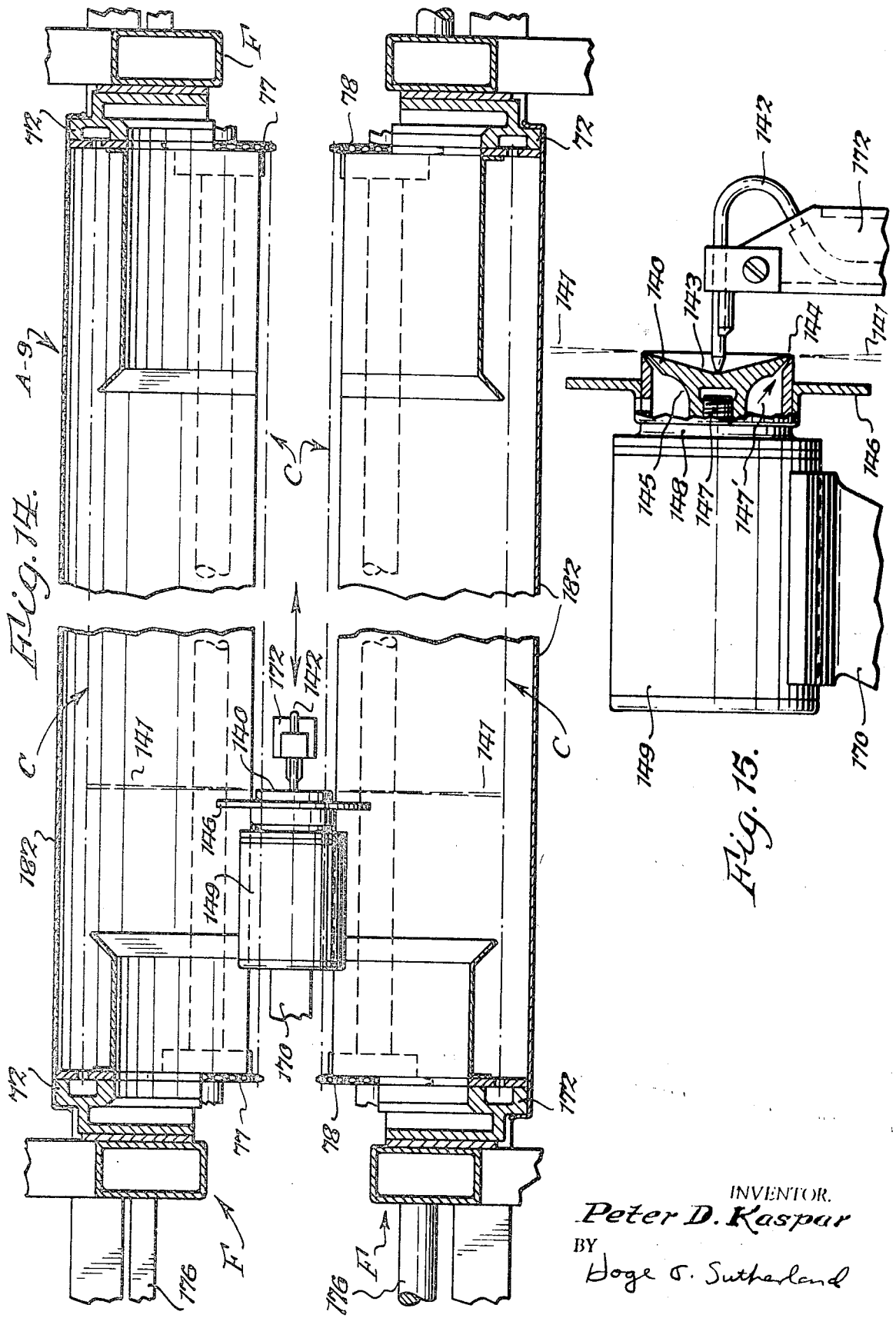

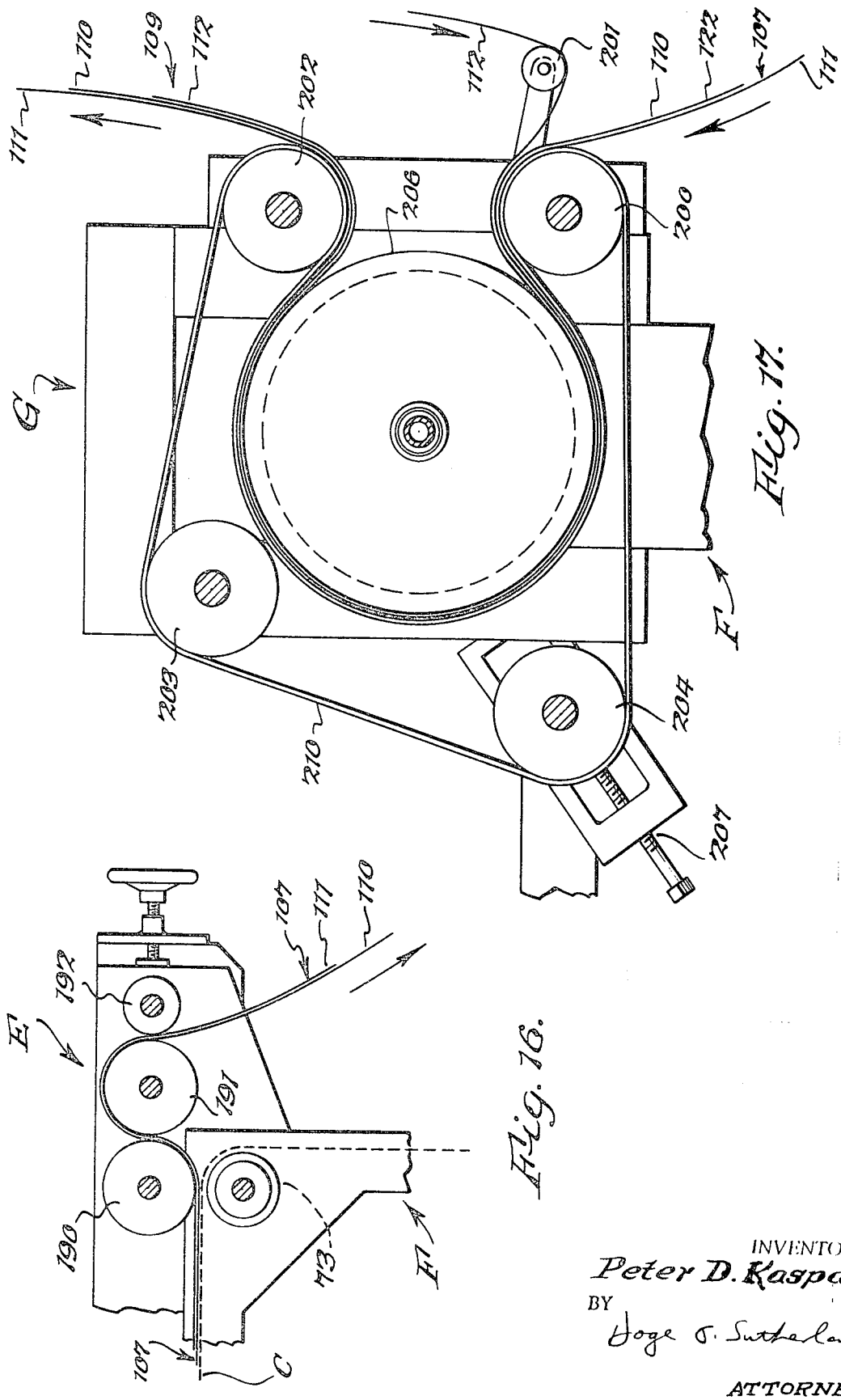

METHOD OF AND APPARATUS FOR FORMING FORMATIONS MATERIAL AND COMPOSITE MATERIAL

BACKGROUND OF THE INVENTION

1. Field of the Invention

The field of art to which the invention pertains includes Class 18, Plastics, Class 117, Coating Processes and Miscellaneous Products, Class 118, Coating Apparatus, Class 128, Surgery, and Class 161, Stock Material and Miscellaneous Articles.

2. Description of the Prior Art

The prior art known to applicant shows methods of and apparatus for forming foraminous material and composite material but does not show the novel continuous method of the instant invention of forming such materials, including the step of depositing finely divided particles of an elastomeric material onto a foraminous forming means at an angle of arrival substantially normal to the forming means, particularly in combination with the other method steps as described and claimed herein.

Further, the specific and novel apparatus of this invention for making such materials, including a means for driving a foraminous forming conveyor in a cylindrical path past a reciprocating and rotating disc for depositing forming material onto the foraminous forming conveyor to form foraminous material or composite material, is not shown in the prior art.

Briefly described, the various methods and apparatus employed in the past to form foraminous material and foraminous composite material have broadly included the following:

1. Punching—in this method, imperforate flat sheet stock or seamless tubular stock is mechanically punched to form holes or interstices in such stock, as exemplified by U.S. Pats. to Spanel No. 2,306,736 and to Teague et al., No. 2,068,456.

2. Blowing—an individual form having recesses in its surface is dipped into latex and air entrapped in the recesses or cavities behind the deposited latex film blows holes in the film before it dries, thereby forming the interstices. See U.S. Pats. to Gienger et al. No. 2,801,445, to Miller et al. No. 3,079,643, to Miller et al. No. 26,021 and to Linscott No. 2,032,942 for patents teaching this method.

3. Spraying—latex or the like is sprayed in a random nonuniform manner in particulate form onto solid portions of a foraminous forming means or deposition backing, such as a foraminous metal plate, with the balance of latex particles arriving at the forming means passing through the openings therein as overspray. Spraying continues until the desired thickness is built up after which the material on the solid portions is coagulated and stripped therefrom to form the foraminous material. See U.S Pats. to Hurt No. 2,032,935 and to Serra No. 3,233,289 as examples of patents teaching this method.

4. Coating—liquid material is deposited onto a forming means and spread only into recesses or channels formed therein. After solidification, such material is stripped from the recesses to form the foraminous material, as exemplified by U.S. Pats. to Ratignier et al. No. 934,214 and to Bird No. 2,865,046.

SUMMARY OF THE INVENTION

This invention is a method of and apparatus for forming foraminous material in a continuous operation by depositing a flowable material, or film such as latex or a latex compound, onto the forming surface of a foraminous forming means in a manner so as to form a strong, attractive, highly porous foraminous material of superior characteristics particularly adapted for making girdles. The invention also comprehends a method of and apparatus for making composite material (using the foraminous material as one of its components), such material finding many uses and, again, being particularly useful as a girdle material.

The method of making the foraminous material (or the base ply of the composite material) includes the steps of driving a forming means (foraminous conveyor) having a flat impervious forming surface in an arcuate (substantially cylindrical) configuration past a depositing means or a plurality of depositing means and depositing a material in particularized form which material in dry form possesses elastomeric properties (hereinafter referred to as elastic material) onto the forming means, at a constant, substantially normal angle thereto, to form with a repeated depositions or progressive depositions a foraminous material of desired thickness and having the foraminous pattern of the forming conveyor.

Once the desired thickness of the base ply has been obtained, to form the composite material, a first adhesive layer is deposited onto a first surface of such base ply and a first material is combined with it while such base ply is still on the forming means to form a two-ply laminated composite material.

This two-ply composite material is then stripped from the forming means and a second adhesive layer is deposited onto the other or second surface of the base ply and a second material is then positioned onto this surface and laminated to the base ply to form a three-ply composite material.

Critical in the practice of the method this invention is the step of depositing the elastomeric material onto the forming means. The important thing is that the elastomeric particles arrive at and onto the flat impervious forming surface of the foraminous forming means at an angle substantially normal to such forming means and applicant has discovered a highly effective method and means for accomplishing this difficult task in a continuous operation.

The apparatus of this invention includes a foraminous forming conveyor which is successively driven by appropriate means in substantially cylindrical configuration past a plurality of depositing means which deposit an elastomeric material in particulate form onto the forming conveyor to form progressive layers of such material, thus to form the elastic or rubber base ply.

The first adhesive depositing means which is identical to the depositing means above described deposits the first adhesive layer onto the first surface of the base ply and the first material is fed by appropriate means onto the first surface of the base ply and laminated to it, after which the two-ply laminated composite material is stripped from the forming conveyor.

The second adhesive depositing means (identical to the first) deposits the second adhesive layer onto the second surface of the base ply and the second material is fed onto the second surface of the base ply and laminated to it to form three-ply laminated composite material.

The depositing means consists of a circular concave disc which is rotatable at great speeds to deposit in particulate form material delivered at the vortex of the disc in liquid or flowable form and onto the forming conveyor at an angle of substantially 90° to the foraminous forming conveyor. A depositing means or device is positioned within each cylindrical configuration of the driven forming conveyor and it has a baffle means which prevents air currents from changing or deflecting the proper angle of deposition.

This invention further provides an improved method of and apparatus for forming elastic or rubber foraminous material or composite material in a continuous operation, such material being a continuous length or web of flat stock material particularly adapted to be made into girdles.

The foraminous material made in accordance with the teachings of the present invention has particular adaptability for use in body constricting garments such as disclosed in U.S. Pat. No. 3,489,154 issued Jan. 13, 1970 entitled "Composite Sheet Material And Garments Made Therefrom," such patent resulting from an application Ser. No. 820,044 filed Apr. 8, 1969, which is a continuation of Ser. No. 706,066 filed Feb. 6, 1969, which in turn is a continuation-in-part of Ser. No. 428,071 filed Jan. 26, 1965.

By following the method of the invention a wide range of designs may be formed, for example, from regularly spaced interstices of uniform size to highly openwork reproductions of lace fabrics with a large variation in size and density of holes.

The method essentially comprises depositing or spraying latex onto the "inside" surface of a cylindrically driven foraminous conveyor. The latex particles are preferably centrifugally projected in a relatively flat stream onto the conveyor to deposit latex substantially simultaneously over a narrow circumferential band. The forming conveyor and the depositing device move relative to each other to deposit latex onto the inside surface of the entire forming conveyor. The size of particle in the spray, the latex viscosity, and the temperature are controlled so that spraying or depositing may be continuous with successive depositions of latex forming thin layers which cohere and solidify into an integral openwork rubber material or base ply of the desired thickness.

Forming the foraminous deposited latex layer upon the inside surface of the cylindrical driven conveyor (that is, the surface on the "inside" of the substantial cylinder formed by the conveyor as it is driven) results in a marked reduction in spraying losses. The conveyor itself tends to confine the latex emanating from the spray depositing means so that there is a substantial increase in projected latex particles which reach the conveyor. In addition, the projected latex particles in the spray impinge on the conveyor at an angle more nearly normal due to the concavely curved inside surface of the conveyor moving in its cylindrical path which is generally a substantially closed figure of revolution. This further reduces overspray loss and filling of interstices.

According to the present invention the latex is centrifugally sprayed from a high speed spinning spray means, preferably a small disc located axially within the cylindrical configuration of the forming conveyor. Latex droplets are thrown tangentially off the spinning disc around its entire periphery producing a relatively flat circular stream or mist which is only slightly divergent. This gives simultaneous spraying of substantially a full 360°, that is, substantially instantaneous deposition upon the entire internal periphery of the conveyor (excluding the small entrance-exit opening) in a relatively narrow circumferential band. With a suitably small disc diameter compared to the diameter of the cylinder, the latex moves nearly radially and impinges substantially perpendicularly on the concave inner surface of the forming conveyor. A complete layer of latex may be deposited over the entire inside surface of the conveyor merely by linear advance of the conveyor or the spray disc relative to the other.

The use of centrifugal spraying further reduces latex losses, since the size of the latex particles is much more uniform than with air gun spraying.

Also, the particle size is closely controllable which is not the case with air gun spraying. This particle size control flows from the fact that the primary determinants, the viscosity of the latex, its flow rate, the angular velocity of the spray disc and its diameter may be made either constant or may be subjected to close control.

The particle size in the centrifugally sprayed stream of latex varies inversely with disc rotational velocity and disc diameter, and varies directly with the volume flow rate to the disc at a given disc diameter and rotational velocity. Consequently with the proper selection of these factors latex particle size may be controlled for optimum rate of deposition. A higher deposition rate may be maintained without running of the latex on the forming means due to faster drying of smaller particles of more uniform size.

From this, it is apparent that the reduction in latex losses is even more pronounced when centrifugal spraying is combined with spraying within a substantially cylindrical configuration as in the instant invention.

The spray disc propells the particles onto the forming conveyor in an annular pattern and by centrifugal force. The disc is mounted in the center of the depositing or spraying area and, accordingly, the particles arrive onto such forming conveyor with a minimum loss resulting from overspray. In other words, substantially all of the particles arrive onto the forming means because of the cylindrical configuration of the forming conveyor and due to the natural annular pattern of the spray from the depositing disc, thus maximizing the depositing operation. This represents an important feature of this invention.

Centrifugal spraying also offers the advantages of faster film build up for the deposited latex. With substantially full 360° simultaneous projection around the periphery of the cylindrically driven conveyor, a higher latex flow rate may be maintained under the same conditions than with random localized air gun spraying.

In the practice of this invention, the dominant feature is the ability to deposit the particles onto the forming surface of the forming conveyor at a constant substantially 90° angle to the forming conveyor. Many advantages flow from such arrival.

One of the most important of these advantages is that by controlling the angle of arrival, the foraminous base ply which is formed thereby has more "breathability" (that is to say, such ply has greater open areas) and has greater strength than would a base ply formed without such controlled arrival. Further, the network which can be said to be componentially a makeup of interconnecting elements and intermediate openings of the foraminous material or base ply which bring about the increased porosity and great strength additionally give a better replica to the design and lastly, and importantly, the interconnecting elements provide a means for obtaining a better adhesive bond between the foraminous base ply and the first and second materials or plies laminated to it.

The elastic foraminous material and base ply formed by the method of this invention has a better surface-to-mass ratio, and hence is stronger than is elastic foraminous material formed using other known methods, including the methods previously described.

None of such methods show particles arriving at a constant 90° angle to the forming means and it is this arrival that plays the major role in forming the strong strands of applicant's foraminous material. Nonuniform particle arrival, for example, results in a sweeping concave lower surface with irregular feathers in the individual strands of such material, such concavity and feathering giving a less desirable, lower surface-to-mass ratio to the strands and to the foraminous material.

By using applicant's method, excessive feathering does not occur, the interconnecting elements are formed with a substantially rectilinear or square configuration without unduly long walls or feathering at its lower ends, hence giving more favorable surface-to-mass ratio.

By following the method of this invention, the individual interconnecting elements of the base ply (or the foraminous material) are formed to range from substantially cylindrical to substantially square in shape. This means that the surface-to-mass ratio of the interconnecting elements approaches an optimum value and the stretch characteristics approach maximum. It is well-known that the optimum surface-to-mass ratio is reached when the principal and secondary axes of the cross section of the interconnecting elements are substantially equal, to wit, when the interconnecting elements is cylindrical, or when the interconnecting elements is square.

When the surface-to-mass ratio of the interconnecting elements of the base ply is optimum the strength and stretch of the interconnecting elements approach maximum value and the surface area minimum value thereby resulting in a base ply that has the greatest openness for a given modulus and thus providing a foraminous material that when used in a girdle gives the combination of coolness and control. It also follows that when an optimum surface-to-mass ratio is reached, the elastomeric foraminous material interconnecting element has maximum stretch characteristics, viz it is stronger.

Further, since the side surfaces of the interconnecting elements are substantially vertical (again, primarily due to the constant angle of arrival), the intermediate openings defined by such interconnecting elements for a given thickness and a given amount of material, are larger than they would be if the sides of the interconnecting elements were rounded and projected into the intermediate openings to diminish their size. Accordingly, the base ply has greater porosity. The vertical sides of the interconnecting elements also give a sharper and better defined shape to the simulated objects and hence to the lacelike design, and give such interconnecting elements a more desirable surface-to-mass ratio which makes them stronger while at the same time gaining the advantages of clarity of design and greater porosity.

Multi-ply materials may be made in accordance with the teachings of the present invention.

First materials, such as rubber or wood or paper or cloth, are adhered by an adhesive material to the first surface of the foraminous base ply to form two-ply composite material.

Second materials, such as rubber or paper or wood or cloth, are adhered to the second surface of the foraminous base ply by an adhesive material which is substantially completely deposited within a network of channels on such second surface to form three-ply composite material.

One or more additional plies or coatings of various materials may be adhered to the three-ply composite material to form multi-ply composite material.

This invention further includes a method of and means for forming foraminous material and composite material continuously.

It is particularly difficult to get the constant substantially 90° arrival of the particles on the forming means if operation is continuous. To accomplish this, means are provided to drive the foraminous forming conveyor in a substantially cylindrical path and to reciprocate the depositing (particlizing) means within such the substantial cylinder so formed. These continuous and complimentary motions of the conveyor and depositing means bring about the constant normal arrival of particles onto the forming surface of the forming conveyor and make the continuous operation feature of the method and apparatus of this invention a reality.

Among the superior characteristics, then, of the foraminous material and foraminous composite material made in accordance with this invention are strength, attractiveness, and porosity which together with the other characteristics combine to give new, exciting materials with an untold number of use applications, particularly useful in making girdles having great appeal and utility.

BRIEF DESCRIPTION OF THE DRAWINGS

FIGS. 1 and 2 together are a diagrammatic longitudinal sectional view of the apparatus of this invention showing the continuous foraminous forming conveyor C (heavy dash lines) traveling in straight and curved paths; a plurality of foraminous base ply forming sections A-1 through A-9, the first adhesive applying means B; the first material laminating section D to form the two-ply composite material; the stripping section E; the second adhesive applying means F; and, the second material laminating section G to form the three-ply composite material. Various other parts of the apparatus are shown in FIGS. 1 and 2 including drying stations between the base ply forming sections; a curing oven over the length of the apparatus, brush cleaning means for the conveyor; a steam heated drum; various guide and pressure rolls; means including a triangular belt to position the two-ply material in a catenary with the base ply facing upwardly to receive the second adhesive; and venting means for carrying off the overspray at the forming sections;

FIG. 3 is a plan view of a suitable foraminous conveyor C and further showing its associated supporting, tensioning, and driving means, in detail, with certain parts omitted for clarity;

FIG. 4 is a greatly enlarged fragmentary diagrammatic perspective view showing the three-ply foraminous composite material formed by the apparatus of this invention;

FIG. 5 is a sectional view of the three-ply material taken along 5—5 of FIG. 4;

FIG. 6 is a fragmentary plan view of the preferred foraminous forming conveyor of this invention having a lacelike design;

FIG. 7 is a sectional view taken along line 7—7 of FIG. 6;

FIG. 8 is a longitudinal vertical sectional view taken along line 8—8 of FIG. 9 (partially in elevation) and represents an enlarged showing of the left end of the apparatus shown in FIG. 1. The first adhesive applying means B and the last base ply forming section A-9 (which is typical of the other base ply forming sections) are shown in detail as is the first material laminating section D;

FIG. 9 is a fragmentary and elevational view taken along 9—9 of FIG. 8 and particularly emphasizing the frame and the conveyor supporting, tensioning, and driving means of the apparatus including guide tracks and drive sprockets. It further shows the first adhesive applying means B mounted for reciprocatory motion across the apparatus on guide rails or supports at the top of the apparatus (two applying means B are shown but one is an alternate and is rendered inoperative until needed);

FIG. 10 is an enlarged sectional view of the typical drive means guide track taken along line 10—10 of FIG. 9 but used throughout the apparatus showing the thrust means for obtaining proper conveyor tension during the travel of the conveyor in a flat and in a cylindrical path;

FIG. 11 is a sectional view taken along line 11—11 of FIG. 8 and showing a typical base ply forming section including a rotating and reciprocating disc for depositing particulate material onto the forming conveyor and means for reciprocating the disc including a trolley system and alternate drive belt;

FIG. 12 is an enlarged cross-sectional view taken along line 12—12 of FIG. 11 and showing the trolley wheel suspension and crank type drive belt gripping mechanism;

FIG. 13 is a similar cross sectional view to FIG. 12 taken along line 12—12 of FIG. 11 and showing the spin motor structure, the latex nozzle structure and the pneumatic piston and cylinder that actuates the rack to rotate the gripping crank;

FIG. 14 is an enlarged horizontal sectional view taken along line 14—14 of FIG. 8 and showing a typical base ply forming section including the depositing means or disc for forming the base ply, overspray collecting shields, which are removable, and additional detail of the means for reciprocating the depositing disc, certain parts being shown as a dot dash lines for clarity;

FIG. 15 is a fragmentary view showing a typical depositing disc with latex feed nozzle, such parts being common to all depositing units;

FIG. 16 is an enlarged sectional view of the stripping section E shown at the right end of the apparatus of FIG. 2;

FIG. 17 is an enlarged vertical sectional view of the second material laminating section G showing the two-ply material entering the laminating section an the finished three-ply composite material being taken off the apparatus of this invention.

DESCRIPTION OF THE PREFERRED EMBODIMENT

Figure 18:
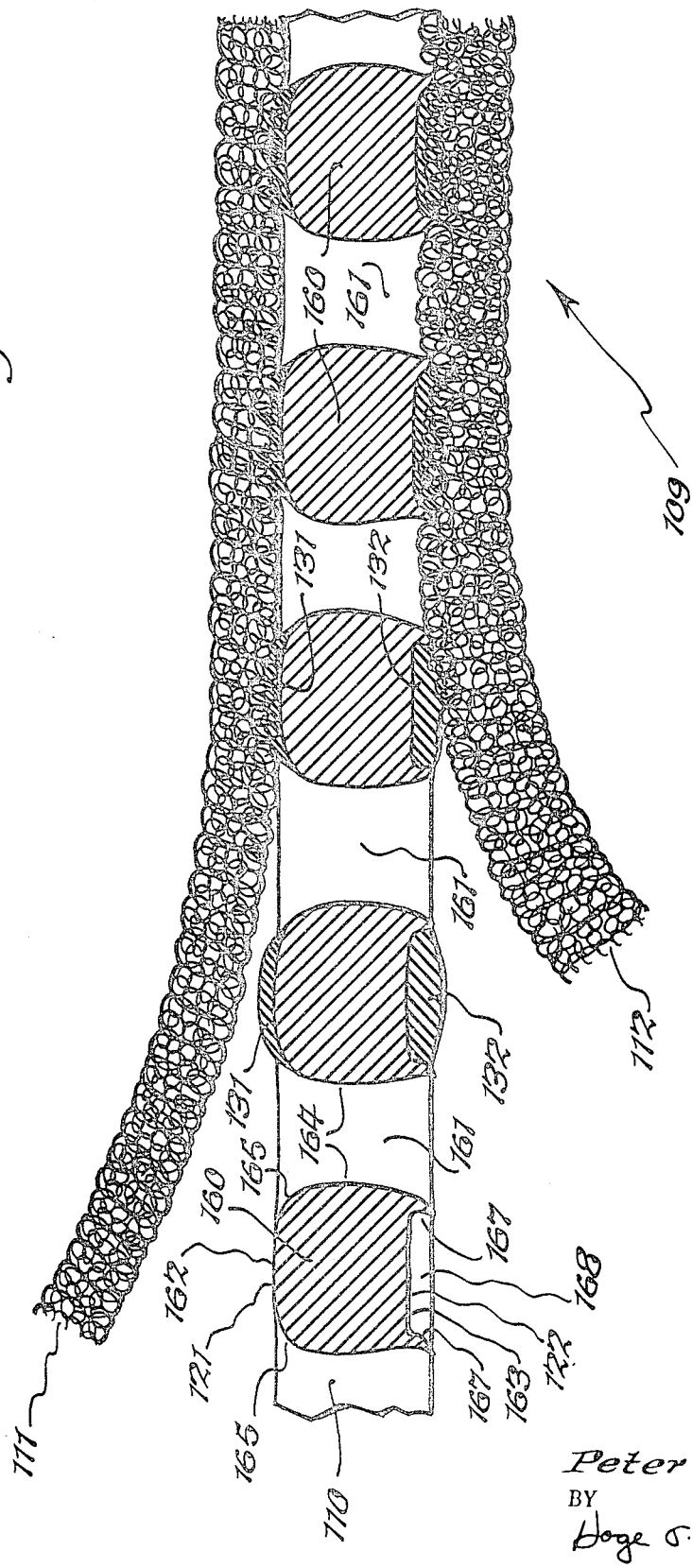
FIG. 18 is a greatly enlarged view of the three-ply composite material showing progressively the sequence of laminating the first and second materials to the base.

This invention is an apparatus for and method of forming foraminous material and composite material.

Generally, such method and apparatus is adapted to form foraminous material (or a base ply for composite material) resembling lace by depositing latex or similar material onto a foraminous forming conveyor C in such a manner to form by repeated depositions the desired foraminous material (or base ply) with its greatly enhanced physical properties.

Referring to the drawings, and particularly FIGS. 1 and 2, it will be seen that the present invention is embodied in an apparatus 9 for continuously forming three-ply composite material 109 comprising a foraminous base ply 110 having a first and a second material 111 and 112 laminated to its first and second surfaces 121 and 122 (see FIGS. 4, 5, and 18 for specific details of the material).

Such apparatus 9 includes means for driving a continuous foraminous forming conveyor C in a plurality of substantially cylindrical paths past a plurality of foraminous base ply (or foraminous material) forming sections A-1 through A-9, each section having a rotating and reciprocating depositing means 140 positioning within the confines of a cylindrical path for depositing elastomeric material 141 in particulate form onto the flat forming surface 157 of the foraminous forming conveyor C at a constant normal angle thereto to form with progressive depositions a foraminous base ply 110 (or foraminous material) of desired thickness and having the design of the foraminous conveyor C.

Once the desired thickness of the base ply 110 has been obtained, a first adhesive 131 is deposited onto the first surface 121 of the base ply 110 at a first adhesive applying section B and, at a first material laminating section D, a first material 111 is laminated to the first surface 121 of such base ply 110 while it is still on the forming conveyor C to form a two-ply laminated material 107.

The two-ply composite material is then stripped from the foraminous conveyor C at a stripping section E and a second adhesive 132 is deposited onto the second surface 122 of the base ply 110 at a second adhesive applying section F and, at a second laminating section G, a second material 112 is laminated to the second surface 122 of the base ply 110 to form the three-ply composite material 109 of this invention.

In the preferred embodiment, the foraminous forming conveyor C is made from cloth in the form of a bobbinet dacron lace having the necessary strength, flatness, and sufficiently thick strands. To make the porous cloth usable as the forming conveyor in the method and apparatus of this invention requires that it first be made impervious.

A method of making the impervious foraminous forming conveyor C of this invention, as more fully shown and described in patent application Ser. No. 706,067, filed Feb. 16, 1968 by Peter D. Kaspar, Earl C. Francis and Clifton H. Hubbard Jr., includes the steps (1) impregnating the cloth of bobbinet dacron lace with a resin composition, (2) pressing such resin impregnated lace in a heated hydraulic press (3) raising the temperature of the press (4) holding the temperature (5) cooling the press and (6) removing the impervious foraminous forming conveyor C from the press, such foraminous conveyor C having the required characteristics for use in this invention.

The resin composition fills all the fissures in the strands of the dacron lace cloth and after heating and cooling provides the necessary rigidity and strand stability to the forming conveyor and at the same time gives it the flexibility required to enable it to be driven in cylindrical paths. The pressing provides the important flat forming surface 157 of the forming conveyor C so necessary to insure good formation of the base ply on this surface and easy stripping of the base ply from such surface.

Bobbinet lace is particularly suited for use as the conveyor material because it is essentially flat and has no over-under strands.

The conveyor C defines an open network with openings between the surface areas of the network, which can be said to be a componential makeup of continuous intermediate openings 151 of varying shapes and configurations. The intermediate openings 151 constitute approximately 10 to 30 percent of the total surface area of conveyor C.

The preferred embodiment of the forming conveyor C is shown in FIGS. 6 and 7, such conveyor having a nonsymmetrical design in the form of a lacelike pattern.

Each interconnecting element 150 has means for defining a substantially flat top forming surface 152 and bottom surface 152' and substantially vertical side surfaces 153.

The interconnecting element 150 and intermediate openings 151 of the conveyor C are arranged in a predetermined manner to form substantially solid areas 154 and substantially open areas 155. The solid areas 154 are in the form of a simulated objects, such as flowers, and the solid areas 154 and the open areas 155 are arranged in a predetermined manner to form a nonsymmetrical lacelike design 156.

The solid areas 154 preferably range from 2 inches wide (the greatest dimension) and 1 inch long (transverse the greatest dimension) to 0.050 of an inch wide and 0.050 of an inch long.

The conveyor C is thin, of the order of 0.010 of an inch thick and has around 400 interstices per square inch in the substantially open areas 155 and from around 10 to 100 interstices in the substantially solid areas 154; thus, even the solid areas 154 have some porosity.

The top surface 152 of each strand 3 is generally flat and together such surfaces 152 define the impervious top flat forming surface 157 of the forming conveyor C.

The forming conveyor, thus formed, is made into an endless conveyor C and is operably connected to means for supporting, tensioning, and driving such conveyor C so that it will be held taut and substantially wrinkle free during the forming operation, such means being more fully shown and described in patent application Ser. No 704,918 filed Feb. 12, 1968 by Peter D. Kaspar entitled Apparatus for Supporting And Driving A Flexible Conveyor.

Referring to the drawings, it will be seen that the flexible conveyor C is movably mounted on a frame F, and has a first longitudinal extending edge 1 and a second longitudinal extending edge 2, as shown most clearly in FIG. 3.

A first conveyor edge binding or border strip 10 is folded around and secured at its inner edge to the first edge 1 of the conveyor C substantially throughout its length and a second conveyor edge binding strip 20 is folded around and secured at its inner edge to the second edge 2 of the conveyor, by appropriate means.

A first row 100 of longitudinally extending apertures 101 is disposed adjacent the outer edge of the first strip 10 and a second row 200 of longitudinally extending apertures 201 is disposed adjacent the outer edge of the second strip 20.

The apertures 101 and 201 are punched through the dacron binding strips 10 and 20 only, near their outer folded over edges, and grommets G are inserted. The strips 10 and 20 extend substantially the long length of the conveyor C, as do the rows of apertures 100 and 200.

A third drive chain roller strip 30 is adjustably connected to the second binding strip 20, in a manner to be described.

A third row 300 of longitudinally extending apertures 302 is disposed adjacent the inner edge of the drive chain strip 30 and a fourth row 400 of longitudinally extending apertures 401 is disposed adjacent the outer edge of the drive chain strip 30.

The apertures in the first, third and fourth rows 100, 300, and 400 are disposed in line with each other and the apertures in the second row 200 are staggered with respect to the apertures in rows 100, 300 and 400.

Conveyor supporting means 40, conveyor tensioning means 50, and conveyor driving means 62 are movably mounted on the frame F, as will be further explained, and means are provided to operably connect these supporting, tensioning, and driving means to the conveyor C, also further to be explained.

The conveyor supporting means 40 includes a first row and a second row of supporting members 43 extending longitudinally of the conveyor C and disposed parallel to each other.

Each of supporting members 43 includes a hook or bollard 64 mounted at the inner edge of an arm 66 which, in turn, is integral at its outer edge with the conveyor driving means 62.

The means to operably connect the conveyor C to the conveyor supporting means 40 includes means to detachably connect the first edge 1 of the conveyor C to the first row 41 of the supporting members 43 and the second edge 2 of the conveyor C to the second row 42 of supporting members 43.

The conveyor tensioning means 50 comprises an elastic cord 51 which is slidably received in apertures 201 in row 200 in the second strip 20 and in apertures 301 in row 300 in the drive strip 30.

The means to operably connect the conveyor C to the conveyor tensioning means 50 includes means to adjustably connect the elastic cord 51 to the second edge 2 of the conveyor C and means to detachably connect the elastic cord 51 to the second row of supporting members 43.

The driving means 62 includes a first longitudinally extending drive roller chain 60 and a second longitudinally extending drive roller chain 61, which are disposed parallel to each other.

The first drive chain 60 travels over a plurality of drive sprockets 70 adjacent the first edge 1 of the conveyor C and the second drive chain 61, travels over a plurality of drive sprockets 73 adjacent the second edge 2 of the conveyor C. The drive sprockets 70 and 73 are mounted for rotation on the frame F and preferably alternate sprockets are rotatably driven by an appropriate drive means, preferably in the form of a motor and connecting means (not shown).

It is important to note that the sprockets 70 and 73 are critically positioned at the points the conveyor C changes its direction of travel. Thus, for example, sprockets 77 are positioned at the points the conveyor C enters the cylindrical paths and sprockets 78 are positioned at the points the conveyor C leaves the cylindrical paths, as shown in FIG. 8. Since the sprockets support the entire weight of the conveyor C and since the greatest stresses occur at the points the conveyor changes direction thereby accentuating the tensioning problem at such points, it has been found that by so positioning the sprockets, more effective support and tensioning is obtained.

In particular, the positioning of entrance and exit sprockets 77 and 78 at the entrance and exit of each of the cylindrical paths, enables better and more uniform tensioning of the conveyor C as it travels in such cylindrical path and into and away from such path.

The first edge 1 of the conveyor C with the first binding strip 10 is connected to the first drive chain 60 by placing the grommets G in the apertures 101 in the first strip 10 over the hooks or small bollards 64 mounted at the inner edges of arms 66 which are integral at their outer edges with the inner links 65 of the first drive chain 60.

The second edge 2 of the conveyor C with the second strip 20 is connected to the second drive chain 61. The inner edge 31 of the third drive chain strip 30 of doubled over suitably reinforced dacron, in effect a dacron tape, is connected to the second stage edge 2 of the conveyor C by threadingly inserting the elastic means 50 through the apertures 201 in the second row 200 in the second strip 20 and through the apertures 301 in the inner third row 300 in the third strip 30. The outer edge of the drive strip 30 is connected to the second drive chain 61 by placing the grommets G in the apertures 401 in the outer fourth row 400 in the third strip 30 over the hooks or bollards 64 mounted at the inner edges of arms 66 which are integral at their outer edges with the links 65 of the second drive chain 61.

The inner third row 300 of apertures slidability receives the shock elastic means 50, in the form of an elastic cord 51, which is laced back and forth between these grommets in the third row 300 and the grommets in the apertures 201 in the second row 200 in second binding strip 20 that is secured to the conveyor C.

Referring to FIG. 10, means are provided to serve as first thrust bearings and second thrust bearings for maintaining uniform thrust at each edge of the conveyor C throughout its travel. The first thrust bearing comprises the first and second links 65 and 68 of the first and second drive chains 60 and 61 and fins or extensions 67 integral with the second links 68 of the drive chains 61 and 62 comprise the second thrust bearings.

The first and second drive chains 60 and 61, are each connected to drive sprockets 70 and 73 and the fins 67 which are integral with the chains 60 and 61 ride against the inner surface 71 of guide tracks 72, as seen most clearly in FIG. 9.

With the drive chains 60 and 61 thus connected to the sprockets 70 and 73 and continuously driven, the first and second links 65 and 68 of the first and second chains 60 and 61 cooperate with the inner and outer surfaces of the teeth of the drive sprockets 70 and 73 to create a first thrust and the fins 68 riding against the inner surface 71 of tracks 72 cooperate therewith to create a second thrust.

The drive sprockets 70 and 73 and the guide tracks 72 are disposed in a substantially continuous manner one adjacent the other throughout the course of travel of the conveyor C thereby providing substantially continuous thrust or tension for the conveyor at both its edges 1 and 2 through its travel. In other words, when a given point of the drive chains 60 and 61 leaves the control of the drive sprockets 70 and 73, it immediately comes under the control of the guide tracks 72 and when leaving control of the tracks 72 immediately comes under control of the next in line sprockets 73 and 70, thus giving substantially continuous control and continuous tension to the conveyor C throughout its travel.

Means, in the form of reciprocating and spinning discs 140, are provided for depositing elastomeric material 141 in particulate form onto the foraminous forming conveyor C at a constant substantially 90° angle thereto as it is traveling in the cylindrical paths just described to form a foraminous material or the foraminous base ply 110 on such conveyor C.

Each disc 140 is positioned in the center of the spray or deposition area and reciprocates along the longitudinal axis of the cylindrical path. Such rotating disc 140 is connected to a source of liquid latex composition. The plane of rotation of the disc 140 is perpendicular to the longitudinal axis of the cylindrical area or path.

The forming conveyor C is caused to travel in its cylindrical path at a predetermined rate. The latex feed is opened to deliver latex composition to the spray disc 140 which is then started rotating at a calculated number of revolutions per minute.

By selecting appropriate dimensions for the cylindrical spray or deposition area and for the rotating disc 140 and appropriate rotating speed of the disc, it is possible to make the liquid latex composition leave the disc and arrive at the forming conveyor C in a very narrow path. Latex particles leave the disc 140 in a tangential path from the perimeter of the disc and arrive at the forming conveyor C at an angle which is substantially perpendicular to the forming surface 157 of the conveyor C.

The latex particles which arrive at the open intermediate openings 151 of the forming conveyor pass on through without hitting the sides 153 of the intermediate openings 151.

In addition to the above factors it is also important to control the characteristics of the liquid latex composition so that upon arrival and impingement on the interconnecting elements 150 of the conveyor C the droplets of latex coalesce quite readily into a homogeneous film and do not flow into the intermediate openings 151 to clog them up. These characteristics include the surface tension of the latex composition and the thickness of the latex film at the edge of the spray disc 140. This latter in turn depends upon the peripheral speed of the disc, the rate of feed of the latex composition to the spray disc and the viscosity of the latex composition. Ambient conditions of temperature and humidity also play a part these factors are controlled to obtain a deposit of latex which builds up on the solid interconnecting elements 150 of the conveyor C without clogging up the intermediate openings 151 in the conveyor.

As the disc 140 rotates, it also reciprocates along the longitudinal axis of the cylindrical deposition area to deposit latex on the entire surface of the conveyor C. The desired amount of latex can be deposited by one disc 140 reciprocating along the longitudinal axis for a number of times or causing the forming conveyor C to form a plurality of spaced cylindrical spray or deposition areas in each of which a separate disc 140 reciprocates as shown. The reciprocating motion does not significantly influence the angle of arrival of the latex droplets because it is minimal in relation to the tremendously high speed of travel of the latex droplets. For example, where the speed of the disc is 8,000 r.p.m. and its diameter is 2 inches, the initial velocity of the latex spray particle is $$\frac{8000 \times 3.1416 \times 2}{12}$$

or 4,200 feet per minute.

In this manner, the disc 140 traverses the conveyor C across its entire transverse dimension (or any preselected dimension), and the rotating disc 140 simultaneously sprays an annular band of particlized latex around the entire periphery of the forming conveyor C. Drying units are positioned within the housing to supply air for drying the latex so that spray deposition may be continuous. Apertures are provided in the housing for removal of latex overspray into a suitable exhaust system. When the desired thickness of latex film for the rubber base ply is deposited, for example, 0.015 to 0.020 inches, the deposited film is given a thin coating of adhesive which may be the same latex composition used for the base ply. The adhesive film is not dried, but is left wet and tacky.

The speed and length of the foraminous conveyor C are selected so that each layer of latex deposited on the conveyor C is gelled before spraying on of the next layer upon passage through heat elements of other suitable heating device. In this manner, the complete gauge thickness required in the base ply 110 or foraminous material may be deposited in several layers by one pass of the belt under the alternately positioned latex sprays and driers.

The foraminous material (or foraminous base ply 110 of the composite material) may be formed from an dispersible or transferable liquid or flowable material which, after dispersion or transfer, coagulates or solidifies into solid form. The foraminous base ply may have a symmetrical or nonsymmetrical design, and is strong and self sustaining.

In a preferred embodiment, the foraminous base ply 110 has a nonsymmetrical design and is of an elastomeric material, such as deposited latex. The base ply consists of a plurality of interconnected interconnecting elements 160 for strength and to make it self-sustaining and a plurality of intermediate openings 161 defined by such interconnecting elements 160 to make it airy and porous, as shown most clearly in FIG. 18.

Each interconnecting element 160 has means defining a substantially horizontal top surface 162 and bottom surface 163 and substantially vertical side surfaces 164 which generally define a strand body. The body, which may be as small as 9.010 of an inch wide, is preferably of the order of 0.020 of an inch wide and 0.020 of an inch thick and has a low surface-to-mass ratio in order to give maximum performance for the elastomeric material used and to give good strength and longevity characteristics.

The interconnecting elements 160 of the base ply 110 are arranged in a predetermined manner to form substantially solid areas and substantially open areas. The solid areas are in the form of a simulated object, such as flowers, and the solid areas and the open areas are arranged in a predetermined manner to form a nonsymmetrical lacelike design.

The base ply is thin, of the order of 0.020 of an inch thick and has around 400 interstices per square inch in the substantially open areas and from around 10 to 100 interstices in the substantially solid areas; thus, even the solid areas have some porosity. The number of intermediate openings of the base ply (and the conveyor C) may of course be varied and the open areas and solid areas can be formed by use of varying dimensions rather than by the number of intermediate openings.

The top surface 162 of each strand is generally flat and has somewhat rounded corners 165. The bottom surface 163 of each strand 160 has means defining a generally flat, dished bottom floor 166 and channel walls 167 which extend outwardly from the bottom floor 166, which define a channel 168 of fairly uniform depth from channel wall 167 to channel wall 167. The channel walls 167 are consistently well formed throughout the first 0.003 of an inch of their depth or thickness and extend outwardly from the bottom floor around 0.004 of an inch. A few feathers or incompletely formed extensions of the channel walls may extend downwardly to 0.008 of an inch.

The bottom surfaces 163 of the interconnected elements 160 form the second surface 122 of the base ply 110 and the channels 168 on such surface are interconnected to define a network of adhesion channels. The top surfaces 162 of the interconnected elements 160 form the first surface 121 of the base ply 110.

The individual interconnecting elements 160 of the base ply 110 (or foraminous material) range from substantially cylindrical to substantially square in shape. This means that the surface-to-mass ratio of the interconnecting elements 160 approaches an optimum value and the stretch characteristics approach maximum. It is well-known that the optimum surface-to-mass ratio is reached when the principal and secondary axes of the cross section of the interconnecting elements substantially equal, to wit, when the interconnecting elements is cylindrical, or when the interconnecting elements is square.

Further, since the side surfaces 164 of the interconnecting elements 160 of the base ply 110 are substantially vertical, intermediate openings 161 defined by such interconnecting elements 160, for a given thickness and a given amount of material, are larger than they would be if the sides of the interconnecting elements 160 were rounded and projected into the intermediate openings 61 to diminish their size. Accordingly, the base ply 110 of this invention has greater porosity. The vertical sides 164 of the strands 160 also give a sharper and better defined shape to the simulated objects and hence to the lacelike design, and give such strands a more desirable surface-to-mass ratio which makes them stronger while at the same time gaining the advantages of clarity of design and greater porosity.

After the foraminous base ply 110 has been formed by depositing the latex particles onto the foraminous forming conveyor C, a first adhesive material 131 is deposited onto the first surface 121 of the base ply 110 at the first adhesive applying section B and a first material 11 is laminated to it at the first laminating section D to form the two-ply composite material 107 of this invention.

At section D, the first material 111, in the form of a stretch fabric is mounted over the forming conveyor C. The fabric 111 is preferably made of stretch yarn which has been treated so that the yarn strands are crimped or coiled to provide the fabric with an extensibility and recoil properties. For example, the fabric 111 may have an elongation of 50–175 percent in the vertical direction and 280 percent in the horizontal or circumferential direction. Such fabrics are commonly knitted from nylon (Helanca) yarn, but may also be of other manmade fibers, such as polyester or acrylic. The fabric may even be of stretchable cotton yarn or blends of these extensible yarns.

After drying the final latex layer of the base ply 110, deposited at section A–9, the first adhesive material 131 of latex, is deposited on the first surface 121 of base ply 110 by a disc 140 and the fabric 111 is laminated to this surface by means of bonding rolls 230 and 231.

The two-ply material 107 is then passed through a heated environment 189 to dry the adhesive and securely bond the fabric 111 uniformly to the first surface 121 of the rubber base ply 110. The two-ply material 107 is then stripped from forming conveyor C. The forming conveyor C is then recycled for repeating the initial phases of the method.

Drying means 188 are positioned between the sections A–1 to A–9 to dry the deposited latex between depositing operations and heating chamber 189 is positioned between the second material laminating section D and the stripping section E to properly cure the two-ply material prior to stripping.

It has been found that the treatment of the impervious forming conveyor C with silicone resin prior to forming the base ply 110 thereon greatly facilitates stripping of base ply 110 from the forming conveyor C.

Referring to FIG. 16, in stripping the two-ply material 107 from the conveyor C at stripping station E, the two-ply material 107 is directed between the nip of stripping rolls 190 and 191 and over roll 191 and into the nip between such roll 191 and a pressure roll 192 and hence onto means for delivering such two-ply material to the second adhesive applying section F.

The means for delivering the two-ply material from the stripping section E to the second adhesive applying section F includes a long first delivery belt 194 which is positioned beneath adhesive applying section F, as shown in FIG. 2. Such belt 194 delivers the material 107 to a second triangular delivery belt 195 positioned around rolls 196, 197 and 198 and such material is directed between the nip of the belt 195 at roll 198 and a guide roll 199.

The two-ply material 107 is then positioned or hung in a catenary between roll 198 and an entrance roll 200 of the second material laminating section G and the second adhesive material 132, preferably latex, such as the composition used for the base ply 110, is sprayed onto its second surface 122 of the base ply 110 by a spinning disc 140 identical in operation to the discs 140 used to deposit the base ply 110.

After the second adhesive material 132 is deposited onto the second surface 122 of the base ply 110 a second material 112 is laminated to it at a second laminating section G to form the three-ply composite material 109 of this invention.

Referring to FIGS. 2 and 17, in particular, the second material 112 is mounted on the frame F adjacent the laminating section G and such material is fed around a tension roll 201 and onto the second surface 122 of the base ply 110. The three-ply material is then fed onto a laminating belt 210 which is trained over a roll 200, around a heated drum 206, and around guide rolls 202, 203 and 204, as shown in FIG. 17. The pressure on the belt 210 in relationship to the drum 206 (and hence the pressure applied to laminate the second material 112 to the base ply 110, as the three-ply material is fed by the belt 210 around periphery of the drum 206) may be regulated by means of tension regulator 207 in a manner well-known in the art.

The pressure preferably is gentle and such pressure and the heat of the drum 206 effectively laminates the second material 112 to the second surface 122 of the base ply 110 to form the three-ply composite material 109 of this invention.

This last coating of latex adhesive 132 tends to fill, at least partially, the channels 168 of the interconnecting elements 160 of the base ply 110 and form puddles of wet latex. The two-ply material 107 with the second surface 122 of the base ply 110 exposed is then passed through the second laminating section G at which time the secondary material 112 is deposited on the layer of wet latex 132 so as to substantially cover the top of the interconnecting elements 160 of the base ply 110. The three-ply material is then passed under the previously described means which lightly presses the second material 112 into the puddles of wet latex.

With the network of shallow lakes of adhesive in the channels 168 when the second material 112 is pressed down onto the second surface 122 it will enter a depth of latex adhesive that is great enough for good bonding.

Thus, good adhesion to both the first and second surfaces 121 and 122 of the base ply 110 is obtained. The three-ply material 109 is passed through a drying oven (not shown) where the adhesive is dried. The material is then passe into a curing oven (not shown) for curing the rubber layers at conventional time-temperature cycles, for example 250° F., for one-half hour. It may be festooned over rolls and then passed through guide rolls as it leaves the oven. The three-ply material is conveniently rolled up on reel.

Specifically in the practice of this invention, a forming material, that starts as a flowable material and forms a solid is fed at a controlled rate from a supply source (not shown) through the orifice of a conduit means 142 connnected to such supply source and onto the concave surface 143 of a rotating disc 140. The material is preferably an elastomer, such as latex, or a latex compound, and is thrust onto the surface of the disc 140 forming a thin film over such surface to the disc edge 144. At or adjacent the disc edge 144, the liquid latex is atomized or particlized into finely divided particles 141 by action of the rotating disc 140 and such particles 141 are propelled from the disc edge 144 and deposited onto the forming surface 157 of a foraminous forming means, preferably in the form of a foraminous forming conveyor C, the structure of which has described in detail.

It is important that the edge 144 of the spinning disc 140 remains sharp throughout the depositing operation. If such is not the case, a thick film of latex tends to accumulate at the edge and particularly on the bottom surface 145 of the disc adjacent the edge 144. Such thick film, in the form of large particles, may be dislodged during the depositing operation and propelled onto the surface of the forming conveyor C to form an undesirable configuration.

The film is prevented from accumulating on the bottom surface of the disc 140 at the edge 144 thereof (which would dull the sharpness of the edge 144 because of such deposition) by providing a shield or a baffle means 146 integral with the disc 140 and positioned slightly offset from and adjacent to the bottom edge 145 of the disc 140. Small quantities of latex still find their way to the bottom surface 145 but the quantity is insufficient to appreciatively dull the edge 144 of the disc 140. Further, an air blast 147' is continuously projected along and against such edge 144 at the bottom surface 145 to clean away the small quantity of latex mist accumulating on such bottom surface 145. This, or course, further helps to maintain the sharpness integrity of the edge 144 which in turn maintains the particle size integrity of the latex 141 propelled centrifugally from such edge 144 and onto the forming surface 157 of the forming conveyor C.

The disc 140 is mounted at the end of shaft 147 suitably journaled in a hollow shaft casing 148 and rotatably driven by a motor 149 mounted on one end of a supporting arm 170, the other end of which is connected to a means 171 for reciprocating said disc 140 within the cylindrical path of the conveyor C. The tube 142 for feeding latex to the disc 140 is supported by a second arm 172 which is also connected to the reciprocating means 173 so that both the disc 140 and the feed tube 142 will be reciprocated together in the positions shown in FIG. 15 upon activation of the reciprocating means 171. The latex may be fed to tube 142, for example, by a constant displacement pump or by gravity. Control of latex flow rate is accomplished by pressure in the feed tube 142 and by an adjustable orifice.

Control of latex volume or flow rate is another advantage of centrifugal spraying. It is not obtainable with air gun spraying. The latter is subject to flow rate variations caused by build up of coagulated latex deposits on the orifice of the gun. This not only throttles the projected latex stream, but also causes variations in the spray pattern, resulting in nonuniform deposition of the latex on the forming conveyor. With centrifugal spraying using a dished or concave spinning disc 140 the latex may be fed under relatively constant pressure head from the feed line 142 positioned adjacent the disc, 140 as shown in FIG. 15, or through a feed line included in a hollow shaft on which the disc 140 is supported. In either case the latex may be made to flow onto the disc at a relatively constant rate. It then travels outwardly on the face of the disc 140 until it is flung tangentially from the edge 144 as a flat spray of uniformly sized finely divided particles. Thus, the flow rate can be closely controlled, and the spray pattern and quantity of latex projected onto the forming conveyor C may be made very uniform resulting in a more uniform deposition of rubber in the built-up layer.

Forming the foraminous deposited latex layer upon the inside flat surface 157 of the cylindrically driven conveyor C results in a marked reduction in spraying losses. The conveyor C itself tends to confine the latex emanating from the spray disc 140 so that there is a substantial increase in projected latex particles which reach the conveyor C. In addition, the projected latex particles in the spray impinge on the conveyor C at an angle more nearly normal due to the concavely curved inside surface 157 of the conveyor C moving in its cylindrical path which is generally a substantially closed figure of revolution. This further reduces overspray loss and filling of interstices.

The latex is centrifugally sprayed from the high speed spinning disc 140 located axially within the cylindrical configuration of the forming conveyor C. Latex droplets are thrown tangentially off the spinning disc 140 around its entire periphery producing a relatively flat circular stream or mist which is only slightly divergent. This gives simultaneous spraying of substantially a full 360°, that is, substantially instantaneous deposition upon the entire internal periphery of the conveyor (excluding the small entrance-exit opening) in a relatively narrow circumferential band. With a suitably small disc diameter compared to the diameter of the cylinder, the latex moves nearly radially and impinges substantially perpendicularly on the concave inner surface of the forming conveyor C.

It is important to note that as the particles 141 from the disc 140 arrive onto the flat surface 157 of the conveyor that such surface 157 is maintained in a substantially wrinkle free condition by the previously described conveyor tensioning means.

Essentially, the reciprocating means 171 is a trolley system 174 having trolley wheels 175 riding on tracks 176 mounted on the frame F of the apparatus.

As illustrated in FIGS. 11, 12 and 13 gripping means 177 are provided within the framework of the trolley 174 to alternately grip the runs 178 and 179 of a belt 180 to selectively drive the trolley 174 along the tracks 176 back and forth laterally of the conveyor C in a manner well known in the art. Such lateral movement of the trolley 174 reciprocates the disc 140 within the cylindrical configuration of the conveyor C.

The gripping means 177 are alternately rendered operable by appropriate means such as electric eyes mounted on the frame F and the particular distance of lateral movement desired may be obtained by positioning these eyes at given points on the frame F.

The belt 180 may be continuously driven by a suitable motor drive 173.

The particles 141 from discs 140 not arriving onto the interconnecting elements 150 of the conveyor C pass through the interstices 151 in such conveyor C as overspray.

Removable shields 182 are positioned around the outside surface of the cylindrically driven conveyor C to collect the overspray from disc 140 which passes through the interstices 151 in the conveyor C. Periodically, these shields 182 are removed, cleaned and replaced. If desired, one or more of the forming sections A-1 through A-9 may be shut down without effecting the operation of the other sections and the shields 182 may be cleaned at this section while it is not in operation.

To further aid in collecting the overspray and to aid in the base ply forming operation, a suction means or exhaust 183 is positioned adjacent the shields 182 and the conveyor C and is operable to remove such overspray through an opening 184 in such shields 182. The suction further pulls or sucks any material caught in the interstices 151 of the conveyor C through such interstices to keep them clean and to thereby give the base ply 110 formed on such conveyor C cleaner interstices 161 and, thus, better porosity.

The simplicity of the exhaust system and the resulting greater cleanliness of the method is another advantage of spraying inside a cylindrical configuration. With external spraying, the overspray passes through the foraminous forming means directly into the interior of the apparatus and deposits there. An efficient easily designed exhaust system is difficult with external spraying, since the spray takes the form of an expanding cone compared to the flat disc spray, and particularly since it is more unconfined than when spraying from within a forming conveyor.

The method and apparatus of this invention provides a wide variety of designs limited only by the designs of the forming conveyor C and strength requirements of the foraminous material or composite material. A forming conveyor with uniformly spaced holes of uniform size may also be employed.

Many modifications and variations of the above-described specific embodiments of the invention will suggest themselves to those skilled in the art. However, these are to be considered within the scope of the present invention. For example, in utilizing centrifugal spraying, the spray means need not be a concave disc, but may be of any suitable design, such as a hollow inverted cone in which the latex is fed to the internal periphery of the cone, and gradually travels downwardly on the inside surface of the inverted cone to the edge where it is tangentially projected as a flat spray.

This method and apparatus invention has been described primarily as it relates to forming three-ply composite material. It is to be understood that such method and apparatus, if desired, may be advantageously used for forming only foraminous material per se with no first or second materials laminated to it. As such, the first and second adhesive and laminating sections are phased out and the forming sections A-1 through A-9 form the foraminous material (110 in FIG. 1) desired.

The term "foraminous" as used in the foregoing specification and in the appended claims means an object provided with a multiplicity of interstices, in any pattern or randomly distributed, in which the open area may vary from a mere fraction, e.g. a few percent, of the total surface area up to 50 percent or more of the total area.

The term "rubber" as used in the foregoing specification and appended claims means any elastomeric substance, synthetic or natural, possessing elastic properties which render it suitable for use in body confining garments such as girdles, or other articles of apparel which may be produced by the method of the invention. In this connection, other articles which may be specifically mentioned by way of illustration rather than limitation are bathing suits, brassieres, abdominal and other anatomical supports and braces. The method of the invention is also suitable for the production of any foraminous rubber articles of continuously curved surface such as coverings for foam rubber cushions and other upholstery coverings.

"Latex" as used herein means any aqueous dispersion of an elastomeric substance.

I claim:

1. A method of forming a continuous foraminous film sheet which comprises,
  driving successive portions of a continuous foraminous conveyor in a substantially cylindrical path,
  depositing a material which in dry form possesses elastomeric properties from within said cylindrical path in particularized form onto and about the inner surface of said cylindrical conveyor path to build up a foraminous layer of deposited material of desired thickness,
  substantially solidifying the deposited material into a continuous foraminous film sheet,
  and removing said foraminous sheet from said conveyor.

2. A method according to claim 1 in which the material is centrifugally sprayed onto said forming conveyor from a direction axial to the cylindrical path of said conveyor.

3. A method of forming a foraminous material having a plurality of interconnecting elements having intermediate openings therebetween which comprises centrifugally projecting a relatively flat stream of latex particles onto the forming surface of a cylindrically driven foraminous conveyor from a location axial to the cylindrical path of said conveyor to deposit latex substantially perpendicularly upon the forming surface of said conveyor in a relatively narrow circumferential band, and reciprocating said latex stream in a direction transverse to the conveyor drive to deposit latex over the forming surface of said conveyor, coagulating and drying said foraminous material, and stripping said foraminous material from said conveyor.

4. A method according to claim 3 in which said latex deposit is effected by a plurality of rotating discs depositing successive layers of latex on the conveyor for building up said foraminous material to a desired thickness.

5. A method according to claim 3 in which the latex is centrifugally projected from at least one rotating disc.

6. A method of forming foraminous material including the steps of driving a foraminous conveyor having a substantially flat forming surface in a substantially cylindrical path; depositing material in particulate form onto the forming surface of said conveyor at an angle substantially normal thereto by reciprocating a rotating depositing disc within said cylindrical path to centrifugally deposit said material onto said forming conveyor along a reciprocating circumferential band substantially equal to the circumference of said cylindrical path; and, stripping said foraminous material formed by the depositing operation from said foraminous conveyor.

7. A method of forming laminated composite material including the steps of;
    depositing in particularized form a material which in dry form possesses elastomeric properties onto the forming surface of a foraminous forming conveyor at a constant angle of arrival substantially normal thereto to form a foraminous base ply having an arrangement of interconnected solidified elements having openings therebetween to define a channel network, the surfaces on said one face of said base ply being generally flat and having rounded corners and the surfaces on the opposite face of said base ply being generally flat and having dished bottom floors and channel walls that extend outwardly from each of said bottom floors with substantially vertical side surfaces therebetween,
    depositing an adhesive onto the first face of said base ply,
    laminating a first material to said first face of said base ply to form a two-ply laminated composite material,
    stripping said two-ply laminated material from said forming conveyor,
    depositing an adhesive onto the second face of said base ply, and substantially only into said channel network to consistently form adhesive thereon, and
    laminating a second material to said second face of said two-ply laminated material to form a three-ply laminated composite material.

8. The method of claim 7, wherein said foraminous forming conveyor includes a substantially planar network having interconnecting elements and intermediate openings therethrough defining a flat forming surface and said depositing step including the depositing of said material in particulate form substantially only onto the interconnecting elements of said forming surface with the material not so deposited passing through said intermediate openings.

9. A method of making foraminous material including the steps of:
    driving a foraminous forming conveyor in a substantially cylindrical configuration past a plurality of depositing means within said cylindrical configuration, said forming conveyor including an open network of interconnecting elements with intermediate openings therebetween said interconnecting elements further defining a substantially impervious forming surface and a substantially flat second surface with substantially vertical side surfaces therebetween,
    depositing in particularized form a material that starts as a flowable material and which in dry form possesses elastomeric properties onto said forming surface of said foraminous forming conveyor and at a constant angle of arrival substantially normal thereto to form a foraminous base ply, said base ply including a first top face with generally flat interconnecting elements and dished bottom floors and channel walls that extend outwardly from said bottom floors with substantially vertical side surfaces therebetween.

10. A method of making laminated composite material including the steps of:

driving a foraminous forming conveyor along a path of successive cylindrical configurations said forming conveyor having a network of interconnecting elements with intermediate openings therebetween, said network defining substantially solid areas and substantially open areas which are relatively disposed to define a design, said network having a substantially flat first forming surface,
depositing in particularized form a material that starts as a flowable material and which in dry form possesses elastomeric properties onto said forming surface of said forming conveyor and at a constant angle of arrival substantially normal thereto from within said cylindrical configurations to form a foraminous base ply, said base ply substantially duplicating the network configuration of said conveyor of interconnecting elements and intermediate openings to provide substantially solid areas and substantially open areas to define a design conforming substantially to the design of said forming conveyor,
depositing an adhesive onto a first surface of said base ply,
laminating a first material to said first surface to form a two-ply laminated composite material,
stripping said two-ply laminated material from said forming conveyor,
depositing an adhesive onto a second surface of said base ply,
laminating said second material to said second surface of said two-ply laminated material to form a three-ply laminated material.

11. Apparatus for forming foraminous material including, a frame,
    a conveyor movably mounted on said frame,
    conveyor supporting means and conveyor driving means mounted on said frame,
    means to operably connect said conveyor to said conveyor supporting means and to said conveyor driving means,
    said conveyor being a foraminous planar network having openings therethrough and having a forming surface and
    depositing means mounted on said frame, said depositing means including means for particularized depositing of material that starts as a flowable material and which in dry form forms a film sheet possessing elastomeric properties, onto the forming surface of the forming conveyor said depositing means and said forming surface relatively oriented such that the depositing material emanating from said depositing means arrives at said forming conveyor at an angle of arrival substantially normal thereto to form said foraminous material.

12. The apparatus of claim 11, said forming surface of said foraminous conveyor being flat and including interconnected and impervious elements having substantially vertical side surfaces.

13. The apparatus of claim 11, wherein said conveyor driving means includes means to drive said conveyor in a path a substantial portion of which is cylindrical, said cylindrical path defining a depositing area, said depositing means adapted to deliver said depositing material in an annular pattern, said depositing means being positioned within said cylinder.

14. The apparatus of claim 13, wherein said depositing means is a disc, and including means to rotate said disc and to reciprocate said disc substantially axially within said depositing area relative to the direction of drive of said forming conveyor.

15. Apparatus for making two-ply laminated composite material including,
    a frame,
    a foraminous forming conveyor movably mounted on said frame,
    conveyor supporting means and conveyor driving means mounted on said frame,
    means to operably connect said conveyor to said conveyor supporting means and to said conveyor driving means,
    depositing means in spaced-apart relationship to said forming surface, means for driving said forming conveyor in a substantially cylindrical path past said depositing means, said depositing means including means for particularized depositing of material that starts as a flowable liquid and which in dry form forms a film sheet possessing elastomeric properties onto the forming surface of said forming conveyor and said depositing means and said forming surface relatively oriented such that the depositing material emanating from said depositing means arrives at said forming conveyor at an angle of arrival substantially normal to said forming surface to form a base ply, means for depositing adhesive onto a first surface of said base ply, means for laminating a first material to said first surface of said base ply to form a two-ply laminated composite material, and means for stripping said two-ply laminated composite material from said forming conveyor.

16. Apparatus for making three-ply laminated composite material including, a frame, a foraminous forming conveyor movable mounted on said frame, conveyor supporting means and conveyor driving means, mounted on said frame, means to operably connect said conveyor to said conveyor supporting means and to said conveyor driving means, depositing means mounted on said frame in spaced-apart relationship to said forming surface, means for driving said forming conveyor in a substantially cylindrical path past said depositing means, said depositing means including means for particularized depositing of material that starts as a flowable liquid and which in dry form forms a film sheet possessing elastomeric properties onto the forming surface of said forming conveyor and said depositing means and said forming surface relatively oriented such that the depositing material emanating from said depositing means arrives at said forming conveyor at an angle of arrival substantially normal to said forming surface to form a base ply, means for depositing adhesive onto a first surface of said base ply, means for laminating a first material to said first surface of said base ply to form a two-ply laminated composite material, means for stripping said two-ply laminated composite material from said forming conveyor, means for depositing adhesive onto a second surface of said base ply, and means for laminating a second material to said second surface of said base ply to form a three-ply composite material.

17. Apparatus for making laminated composite material including, a frame, a forming conveyor movably mounted on said frame, said conveyor being a foraminous substantially planar network having openings therethrough and having interconnected impervious elements defining a flat upper forming surface, depositing means mounted on said frame in spaced-apart relationship to said forming surface, means for driving said forming conveyor in a substantially cylindrical path past said depositing means, said depositing means including means for particularized depositing of a material that starts as a flowable material and which in dry form forms a film sheet possessing elastomeric properties onto said forming surface of said forming conveyor, said depositing means and said forming surface relatively oriented such that the depositing material emanating from said depositing means arrives at said forming conveyor at an angle of arrival substantially normal to said forming surface to form a base ply, a portion of said material adhering to said forming surface and a portion of said material passing through said network openings, means for depositing adhesive onto a first surface of said base ply, means for laminating a first material to said first surface of said base ply to form a two-ply laminated composite material, means for stripping said two-ply laminated material from said forming conveyor, means for depositing adhesive onto a second surface of said base ply, means for laminating a second material to said two-ply laminated material to form a three-ply laminated composite material.

18. Apparatus of claim 17, wherein said network defines substantially solid areas and substantially open areas which are relatively disposed to define a design.

19. Apparatus for continuously making multi-ply laminated composite materials in the form of a web of flat stock including, a frame, a forming conveyor movably mounted on said frame, conveyor supporting means and conveyor driving means mounted on said frame, means to operably connect said conveyor to said conveyor supporting means and to said conveyor driving means, said conveyor being a foraminous substantially planar network having openings therethrough, depositing means mounted on said frame in spaced-apart relationship to said forming surface, means for continuously driving said forming conveyor past said depositing means, said depositing means including means for continuously particularized depositing of material that starts as a flowable material and which in dry form forms a film sheet possessing elastomeric properties onto said forming surface of said forming surface of said forming conveyor, said depositing means and said forming surface relatively oriented such that the depositing material emanating from said depositing means arrives at said forming conveyor at an angle of arrival substantially normal thereto to form a base ply, means for depositing adhesive onto a first surface of said base ply, means for applying a second material onto said second surface of said base ply, and means for laminating said second material to said two-ply laminated material to form a two-ply laminated composite material in the form of a web of flat stock.

20. Apparatus for forming foraminous film sheet including, supporting means, a conveyor comprising a planar network having openings therethrough, said conveyor movably mounted on said supporting means, one face of said conveyor acting as a forming surface, cooperative conveyor driving means depositing means in spaced-apart relationship to said forming surface, and said depositing means including means for depositing a material in particularized form, said material starting as a flowable material and which in dry form forms a film sheet possessing elastomeric properties on said forming surface of said forming conveyor, said depositing means and said forming surface relatively oriented such that the depositing material emanating from said depositing means arrives at said forming conveyor at a rate to form a substantially uniform foraminous continuous planar network of film sheeting having openings therethrough, and means spaced apart from said planar network to receive said passed through depositing double space material.

* * * * *

UNITED STATES PATENT OFFICE
CERTIFICATE OF CORRECTION

Patent No. 3,615,962  Dated October 26, 1971

Inventor(s) Peter D. Kaspar

It is certified that error appears in the above-identified patent and that said Letters Patent are hereby corrected as shown below:

The title of invention should read -- METHOD AND APPARATUS FOR FORMING FORAMINOUS MATERIAL AND COMPOSITE MATERIAL --.

Signed and Sealed this tenth Day of February 1976

[SEAL]

Attest:

RUTH C. MASON
Attesting Officer

C. MARSHALL DANN
Commissioner of Patents and Trademarks